United States Patent Office 3,277,119
Patented Oct. 4, 1966

3,277,119
ALKYL AND ALKOXYALKYL ESTERS OF 1-AMINO-4-ACRYLOYLAMINO - 2 - ANTHRAQUINONE CARBOXYLIC ACID
Karl-Heinz Beyer, Frankenthal, Pfalz, Klaus Gulbins and Guenter Lange, Ludwigshafen (Rhine), Gerd Louis, Frankenthal, Pfalz, and Hans Weidinger and Hans Wilhelm, Ludwigshafen (Rhine), Germany, assignors to Badishe Anilin- & Soda-Fabrik Aktiengesellschaft, Ludwigshafen (Rhine), Germany
No Drawing. Filed Dec. 21, 1962, Ser. No. 246,360
Claims priority, application Germany, Dec. 29, 1961, B 65,373; Mar. 3, 1962, B 66,198; July 17, 1962, B 68,050
6 Claims. (Cl. 260—377)

This invention relates to new valuable anthraquinone dyes of the general Formula I:

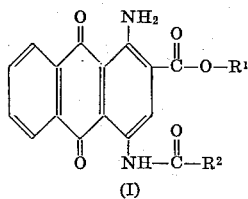

in which $R^1$ stands for an aliphatic radical whose carbon chain may be interrupted by one or more hetero atoms and $R^2$ denotes an aliphatic, cycloaliphatic or araliphatic radical. The invention particularly relates to those dyes having the Formula I in which $R^1$ is a branched or linear saturated aliphatic radical having two to eight carbon atoms whose carbon chain may be interrupted by one or more hetero atoms and in which $R^2$ is a vinyl group. The invention furthermore relates to the use of the last mentioned dyes for the production of colored copolymers.

It is an object of the invention to provide dyes for dyeing synthetic polyesters clear blue to violet shades. A particular object of the invention is to provide dyes readily capable of copolymerization and to provide copolymers prepared with these dyes.

We have found that dyes of the general Formula I are eminently suitable for dyeing synthetic polyesters and that those dyes of the general Formula I in which $R^1$ and $R^2$ have the particular meanings given above are especially suitable for copolymerization.

Dyes of the general Formula I may be obtained by acylation of 1,4-diaminoanthraquinone carboxylic esters of the general Formula II:

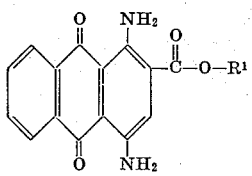

with acylating agents of the general Formula III:

in which formulae $R^1$ and $R^2$ have the above meanings and X denotes a hydroxyl group or the radical of an organic or inorganic acid or preferably a chlorine atom.

Esters of the Formula II may be prepared by conventional methods, for example by the process described in U.S. patent specification No. 2,823,212, by reaction of 1-amino-4-nitroanthraquinone-2-carboxylic acid chloride with the appropriate alcohol in an inert solvent, such as nitrobenzene, or in an excess of the alcohol at 80° to 130° C. and reduction of the nitro compound at 20° to 100° C. in aqueous-ammonical suspension with hydrogen sulfide.

The aliphatic radical $R^1$ may be linear or branched, saturated or unsaturated, and may be interrupted by one or more hetero atoms. The radical preferably contains up to ten carbon atoms. Examples of these radicals are the methyl, ethyl, propyl, isopropyl, butyl, isobutyl, amyl, isoamyl, hexyl, octyl and the allyl group, and also $\beta$-alkoxyethyl groups, such as the $\beta$-methoxyethyl, $\beta$-propoxyethyl and $\beta$-butoxyethyl groups, and also $\beta$-alkoxy-$\beta$-ethoxyethyl groups, such as the $\beta'$-methoxy-$\beta$-ethoxyethyl group.

If the dyes of the general Formula I are to be used for the production of copolymers, $R^2$ is a vinyl group, and saturated aliphatic radicals of the above mentioned type having two to eight carbon atoms are preferred for $R^1$.

The aliphatic, cycloaliphatic or araliphatic radicals $R^2$ may be saturated or unsaturated, linear or branched and may be substituted with halogen atoms, alkoxy groups or acyloxy groups; radicals containing up to ten carbon atoms are preferred. Examples are the methyl, chloromethyl, ethoxymethyl, tertiary-butyl, acetoxymethyl, ethyl, $\beta$-chloroethyl, isopropyl, amyl, vinyl, $\alpha$-methylvinyl, cyclooctyl and $\beta$-phenylvinyl groups.

In dyes which are to be used for the production of copolymers, $R_2$ is a vinyl group.

Acylation of compounds of the general Formula II with compounds of the general Formula III, preferably the acid chlorides, is advantageously carried out in an organic solvent.

It is preferred to use as the solvent, a dialkylformamide, such as dimethylformamide, or a lactam, such as N-methylpyrrolidone. Other organic solvents are however suitable for the acylation, such as dioxane, tetrahydrofuran, o-dichlorobenzene, trichlorobenzene or nitrobenzene.

Acylation proceeds at about 0° to 100° C. but is preferably carried out at 20° to 70° C. In general it is ended within two hours.

To achieve optimum yields, the acylating agent is used in stoichiometric amount up to a multiple excess. It is advantageous to use not more than 1.5 times the equivalent amount. In general 1.1 times the molar amount of acylating agent is sufficient to achieve practically complete acylation.

The procedure may be that the 1,4-diamino-anthraquinone-2-carboxylic ester (Formula II) is dissolved in the solvent and the acylating agent then added to the solution. The temperature of the mixture rises to about 40° C. owing to the reaction heat set free. The mixture is then heated for some time to complete the reaction. The acylamino compounds separate out from the reaction mixture, usually while it is still hot, and may be isolated therefrom by filtration.

The new dyes are in general obtained in good yields and excellent purity. The dyes dye textile materials of synthetic linear polyesters clear blue to violet shades. As compared with the most closely comparable dyes described in Examples 3 and 4 of U.S. patent specification No. 2,823,212, the new compounds are distinguished by the better light fastness, sublimation fastness and cross-dyeing fastness of their dyeings on textile materials of polyesters, particularly of polyethylene terephthalate.

As already mentioned, some of the dyes having the general Formula I are outstandingly copolymerizable. These dyes have the general Formula Ia:

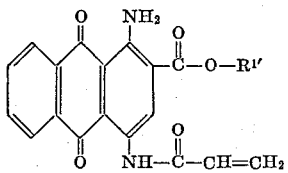

in which $R^{1\prime}$ is a branched or linear saturated aliphatic radical having two to eight carbon atoms whose carbon chain may be interrupted by one or more hetero atoms.

These dyes may be copolymerized with other olefinically unsaturated compounds, for example by the methods described in U.S. patent application Serial No. 105,267, filed April 24, 1961, now abandoned, by Guenter Lange, Guenter Krehbiel, Hans Wilhelm, Ernst Penning, Gerd Louis and Hans Weidinger, and U.S. patent application Serial No. 110,860, filed May 18, 1961 by Hans Wilhelm, Ernst Penning, Gerd Louis, Guenter Lange and Hans Weidinger.

Colored copolymers containing compounds of the general Formula Ia as comonomers are more brilliant and of more intense color than for example copolymers having a 1-amino-4-acryloyl-amino-2-acetylanthraquinone as the colored comonomer.

Dyes of the general Formula Ia, which are susceptible to polymerization to an unexpected extent, may be copolymerized by all methods of copolymerization, for example by bulk, solution, suspension or emulsion copolymerization. They are compatible for copolymerization with the colorless monomers conventionally suitable for such purposes, quite independently of whether these monomers bear reactive groups or not. Suitable monomers are for example all those mentioned in the U.S. patent application Serial No. 110,860 referred to above. It is possible to prepare with the colored comonomers of the Formula Ia, polymers which may be processed into pigments, filaments, threads, sheets and moulded articles or may be used in the form of solutions and dispersions for dyeing and finishing textiles. Details of these methods are described in the said U.S. patent applications Serial No. 105,267 and Serial No. 110,860, and in Belgian patent specification No. 606,037.

The dyes having the Formula Ia may also be grafted with equally good results onto macromolecular substances before or after molding, the grafting being accomplished by conventional methods.

The invention is further illustrated in the following examples in which parts are by weight.

*Examples 1 to 7*

12 parts of acetyl chloride is allowed to flow at 20° C. while stirring into a solution of 32 parts of 1,4-diamino-anthraquinone-2-carboxylic acid n-propyl ester in 102 parts of N-methylpyrrolidone. The reaction mixture heats up and the reaction product begins to separate out. The mixture is heated for another hour at 50° C. and then allowed to cool. The deposited product is filtered off with suction, washed with a little N-methyl-pyrrolidone and then with methanol until the washing liquid running away has only a weak violet color. The product is dried and 25 parts of the dye having the Formula I in which $R^1$ is —$CH_2$—$CH_2$—$CH_3$ and $R^2$ is —$CH_3$ are obtained as red violet crystals having the melting point 176° to 178° C. The dye dyes textile material of polyethylene terephthalate blue violet shades.

Other dyes of the Formula I in which $R^2$ is a methyl group and $R^1$ has the meanings set out in Table 1 are obtained by reacting the 1,4-diaminoanthraquinone-2-carboxylic acid esters set out in the table with acetyl chloride in the manner described above. In every case the dyeings on polyethylene terephthalate are blue violet in shade.

TABLE 1

| Example No. | Ester Parts | Ester $R^1$ | Yield of dye (parts) | M. pt., °C. | Color |
|---|---|---|---|---|---|
| 2 | 33 | n-$C_4H_9$ | 23.5 | 160 | Ruby red. |
| 3 | 34 | i-$C_4H_9$ | 27.0 | 198 | Red violet. |
| 4 | 35 | i-$C_5H_{11}$ | 27.0 | 170–171 | Do. |
| 5 | 36 | n-$C_6H_{13}$ | 27.5 | 127–129 | Do. |
| 6 | 39 | i-$C_8H_{17}$ | 28.5 | 98 | Blue violet. |
| 7 | 32 | —$CH_2CH=CH_2$ | 20.5 | 189–191 | Red violet. |

*Examples 8 to 10*

13 parts of propionyl chloride is allowed to flow at 20° C. while stirring into a solution of 34 parts of 1,4-diamino-anthraquinone-2-carboxylic acid isobutyl ester in 153 parts of N-methylpyrrolidone. The reaction mixture heats up and the reaction product begins to separate out. The mixture is heated for another hour at 50° C. and then allowed to cool. The deposited product is filtered off with suction, washed with N-methylpyrrolidone and then with methanol until the washing liquid running away is only pale violet in color. The product is dried and 35.5 parts of the dye of the Formula I in which $R^1$ is

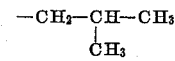

and $R^2$ is —$CH_2CH_3$ is obtained as red violet crystals having the melting point 188° C. The dye dyes textile material of polyethylene terephthalate bright blue violet shades.

Other dyes of the general Formula I in which $R^2$ is an ethyl group and $R^1$ has the meaning given in Table 2 are obtained by using the number of parts of 1,4-diamino-anthraquinone-2-carboxylic acid alkyl ester given in the Table 2 instead of 34 parts of 1,4-diaminoanthraquinone-2-carboxylic acid isobutyl ester and otherwise proceeding in the manner described above. The dyeing on polyethylene terephthalate is blue violet in shade in both cases.

TABLE 2

| Example No. | Ester Parts | Ester $R^1$ | Yield of dye (parts) | Melting point, °C. | Color |
|---|---|---|---|---|---|
| 9 | 36 | n-$C_6H_{13}$ | 26 | 153 | Blue violet. |
| 10 | 39 | i-$C_8H_{17}$ | 32 | 105 | Bluish red. |

*Examples 11 to 19*

15 parts of isobutyryl chloride is allowed to flow at 20° C. while stirring into a solution of 29 parts of 1,4-diamino-anthraquinone-2-carboxylic acid methyl ester in 153 parts of N-methylpyrrolidone. The reaction mixture heats up and the reaction product begins to separate out. The mixture is heated for another hour at 50° C. and then allowed to cool. The deposited product is filtered off with suction and washed with N-methylpyrrolidone and then with methanol until the washing liquid running away has only a weak color. The product is dried and 26.5 parts of the dye of the Formula I in which $R^1$ is —$CH_3$ and $R^2$ is —$CH(CH_3)_2$ are obtained as blue crystals having the melting point 209° to 210° C. The dye dyes textile material of polyethylene terephthalate blue violet shades.

Other dyes of the general Formula I in which $R^2$ is an isopropyl group and $R^1$ has the meanings set out in Table 3 are obtained by using the 1,4-diamino-anthraquinone-2-carboxylic acid alkyl esters set out in the table in the amounts therein specified instead of 29 parts of 1,4-diaminoanthraquinone-2-carboxylic acid methyl ester and otherwise following the procedure of the first paragraph of this example.

Example 28

The procedure of Example 11 is followed but 12 parts of methacryloyl chloride is used. 23.5 parts of the dye having the Formula I in which $R^1$ is methyl and $R^2$ is

TABLE 3

| Ex. No. | Ester | | Yield in parts | M. pt., °C. | Color | Shade of dyeing on polyethylene terephthalate |
|---|---|---|---|---|---|---|
| | Parts | $R^1$ | | | | |
| 12 | 31 | $C_2H_5$ | 31.5 | 198 | Blue violet | Blue violet. |
| 13 | 32 | $i$-$C_3H_7$ | 25.5 | 165–166 | Bluish red | Do. |
| 14 | 33 | $n$-$C_4H_9$ | 26.5 | 154 | do | Do. |
| 15 | 34 | $i$-$C_4H_9$ | 31.0 | 187 | Golden brown | Do. |
| 16 | 36 | $n$-$C_6H_{13}$ | 26.5 | 127 | Red violet | Do. |
| 17 | 39 | $i$-$C_8H_{17}$ | 32.0 | 112 | Blue violet | Do. |
| 18 | 36 | —$CH_2CH_2OCH(CH_3)_2$ | 16.0 | 156 | do | Do. |
| 19 | 38 | —$CH_2CH_2OCH_2CH(CH_3)_2$ | 33 | 135 | Red violet | Red violet. |

Example 20

19 parts of caproyl chloride is dripped at 20° C. while stirring into a solution of 34 parts of 1,4-diaminoanthraquinone-2-carboxylic acid isobutyl ester in 153 parts of N-methylpyrrolidone. The reaction mixture heats up and the reaction product begins to separate out. The mixture is heated for another hour at 50° C. and then allowed to cool. The deposited product is filtered off with suction and washed with N-methylpyrrolidone and then with methanol until the washing liquid running away is only weakly colored. The product is dried and 31 parts of the dye of the Formula I in which $R^1$ is —$CH_2CH(CH_3)_2$ and $R^2$ is —$CH_2CH_2CH_2CH_2CH_3$ is obtained as red violet crystals having the melting point 145° C. The dye dyes textile material of polyethylene terephthalate blue violet shades.

Example 21

24 parts of capryl chloride is used instead of 19 parts of caproyl chloride and the procedure of Example 20 otherwise followed, except that ligroin is used to wash the deposited reaction product instead of methanol. The product is dried and 20 parts of the dye having the Formula I in which $R^1$ is isobutyl and $R^2$ is nonyl (—$C_9H_{19}$) is obtained as blue violet crystals having the melting point 125° C. The dye dyes textile material of polyethylene terephthalate blue violet shades.

Examples 22 to 27

The procedure of Example 20 is followed but 10 parts of acryloyl chloride is used. 31.9 parts of the dye having the Formula I in which $R^1$ is isobutyl and $R^2$ is vinyl (—$CH=CH_2$) is obtained as blue violet crystals having the melting point 188° to 189° C. The dye dyes textile material of polyethylene terephthalate blue violet shades.

Other dyes having the general Formula I in which $R^2$ is vinyl (—$CH=CH_2$) and $R^1$ has the meanings given in Table 4 are obtained by using the 1,4-diaminoanthraquinone-2-carboxylic esters set out in Table 4 in the amounts therein specified instead of 34 parts of 1,4-diaminoanthraquinone-2-carboxylic acid isobutyl ester and proceeding otherwise as described in Example 20. Dyeings on polyethylene terephthalate are all blue violet in shade.

is obtained as blue violet crystals having the melting point 214° to 215° C. The dye dyes textile material of polyethylene terephthalate blue violet shades.

By acylating 34 parts of 1,4-diaminoanthraquinone-2-carboxylic acid isobutyl ester with 12 parts of methacryloyl chloride in the same way, 28.5 parts of the dye having the Formula I in which $R^1$ is isobutyl $$(-CH_2-CH(CH_3)_2)$$

and $R^2$ is

is obtained as red crystals having the melting point 147° C. The dye dyes textile material of polyethylene terephthalate blue violet shades.

Examples 29 to 36

16 parts of chloracetyl chloride is allowed to flow at 20° C. while stirring into a solution of 31 parts of 1,4-diaminoanthraquinone-2-carboxylic acid ethyl ester in 153 parts of N-methylpyrrolidone. The reaction mixture heats up and the reaction product begins to separate out. The mixture is heated for another hour at 50° C. and then allowed to cool. The deposited product is filtered off with suction and washed with N-methylpyrrolidone and then with methanol until the washing liquid running away is only slightly colored. The product is dried and 24.5 parts of the dye of the Formula I in which $R^1$ is ethyl and $R^2$ is chloromethyl (—$CH_2Cl$) is obtained as red violet crystals having the melting point 223° to 225° C. The dye dyes textile material of polyethylene terephthalate red violet shades.

Other dyes of the Formula I in which $R_2$ is chloromethyl and in which $R^1$ has the meanings given in Table 5 are obtained by using the 1,4-diaminoanthraquinone-2-carboxylic acid alkyl esters set out in the table in the amounts therein specified instead of 31 parts of 1,4-diaminoanthraquinone-2-carboxylic acid ethyl ester and

TABLE 4

| Example No. | Ester | | Yield in parts | M. pt., °C. | Color |
|---|---|---|---|---|---|
| | Parts | $R^1$ | | | |
| 23 | 35 | $n$-$C_5H_{11}$ | 30.0 | 136 | Red violet. |
| 24 | 39 | $i$-$C_8H_{17}$ | 26.9 | 100–102 | Blue violet. |
| 25 | 37 | —$CH_2CH_2OCH_2CH_2CH_3$ | 29.6 | 137–139 | Do. |
| 26 | 37 | —$CH_2CH_2OCH(CH_3)_2$ | 35.0 | 151 | Do. |
| 27 | 38 | —$CH_2CH_2OCH_2CH_2CH_2CH_3$ | 30.0 | 108 | Red violet. | proceeding otherwise as in the first paragraph of this example. All the dyeings on polyethylene terephthalate have a red violet shade.

TABLE 5

| Example No. | Ester | | Yield in parts | M. pt., °C. | Color |
|---|---|---|---|---|---|
| | Parts | $R^1$ | | | |
| 30 | 33 | n-$C_4H_9$ | 34 | 189 | Red violet. |
| 31 | 34 | i-$C_4H_9$ | 29 | 185 | Do. |
| 32 | 36 | n-$C_6H_{13}$ | 33.5 | 140–141 | Blue violet. |
| 33 | 39 | i-$C_8H_{17}$ | 25 | 90 | Blue. |
| 34 | 32 | —$CH_2CH=CH_2$ | 23.5 | 189–190 | Red violet. |
| 35 | 36 | —$CH_2CH_2OCH(CH_3)_2$ | 40 | 140 | Blue violet. |
| 36 | 38 | —$CH_2CH_2OCH_2CH(CH_3)_2$ | 37 | 116 | Do. |

*Examples 37 to 45*

29 parts of 1,4-diaminoanthraquinone-2-carboxylic acid methyl ester is acylated as described in Example 11 but using 17 parts of β-chloropropionyl chloride, 24.5 parts of the dye having the Formula I in which $R^1$ is —$CH_3$ and $R^2$ is —$COCH_2CH_2Cl$ is obtained as red violet crystals having the melting point 210° C. The dye dyes textiles of polyethylene terephthalate blue violet shades.

Other dyes of the general Formula I in which $R^2$ is —$CH_2CH_2Cl$ and $R^1$ has the meanings set out in Table 6 are obtained by using the 1,4-diaminoanthraquinone-2-carboxylic acid alkyl esters set out in Table 6 in the amounts therein specified instead of 29 parts of 1,4-diaminoanthraquinone-2-carboxylic acid methyl ester, and proceeding otherwise as stated above. All the dyeings on polyethylene terephthalate are blue violet in shade.

TABLE 6

| Example No. | Ester | | Yield in parts | M.pt., °C. | Color |
|---|---|---|---|---|---|
| | Parts | $R^1$ | | | |
| 38 | 31 | -$C_2H_5$ | 34 | 193 | Blue violet. |
| 39 | 32 | n-$C_3H_7$ | 27.5 | 195–196 | Do. |
| 40 | 32 | i-$C_3H_7$ | 28 | 195 | Do. |
| 41 | 33 | n-$C_4H_9$ | 33.5 | 150 | Do. |
| 42 | 34 | i-$C_4H_9$ | 33 | 165 | Do. |
| 43 | 35 | i-$C_5H_{11}$ | 26 | 155 | Red violet. |
| 44 | 39 | i-$C_8H_{17}$ | 38 | 122 | Blue violet. |
| 45 | 38 | —$CH_2CH_2OCH_2CH(CH_3)_2$ | 37 | 146 | Do. |

*Example 46*

The procedure of Example 20 is followed by acylation is effected with 16 parts of ethoxyacetyl chloride. 32 parts of the dye of the Formula I in which $R^1$ is —$CH_2CH(CH_3)_2$ and $R^2$ is —$CH_2OC_2H_5$ is obtained as bluish red crystals having the melting point 150° to 151° C. The dye dyes textile material of polyethylene terephthalate red violet shades.

*Example 47*

The procedure of Example 46 is followed but using 18 parts of acetoxyacetyl chloride. 27 parts of the dye of the Formula I in which $R^1$ is —$CH_2CH(CH_3)_2$ and $R^2$ is —$CH_2OCOCH_3$ is obtained in the form of blue violet crystals having the melting point 168° to 170° C. The dye dyes textile materials of polyethylene terephthalate bright blue violet shades.

*Example 48*

16 parts of trimethylacetyl chloride is allowed to flow into a solution of 32 parts of 1,4-diaminoanthraquinone-2-carboxylic acid allyl ester in 153 parts of N-methylpyrrolidone at 20° C. while stirring. The reaction mixture heats up and the reaction product begins to separate out. The mixture is heated for another hour at 50° C. and then allowed to cool. The deposited product is filtered off with suction and washed with N-methylpyrrolidone and then with methanol until the washing liquid running away is only slightly colored. The product is dried and 20.5 parts of the dye of the Formula I in which $R^1$ is —$CH_2CH=CH_2$ and $R^2$ is —$COC(CH_3)_3$ is obtained as red violet crystals having the melting point 169° to 170° C. The dye dyes textile material of polyethylene terephthalate blue violet shades.

*Example 49*

Acylation is carried out as described in Example 48 but with 16 parts of ethoxyacetyl chloride. 28 parts of the dye of the Formula I in which $R^1$ is —$CH_2CH=CH_2$ and $R^2$ is —$CH_2OC_2H_5$ are obtained as blue violet crystals having the melting point 145° C. The dye dyes textile materials of polyethylene terephthalate red violet shades.

*Example 50*

The procedure of Example 48 is followed but using 22 parts of cyclooctanecarboxylic acid chloride instead of 16 parts of trimethylacetyl chloride. 14 parts of the dye having the Formula I in which $R^1$ is —$CH_2CH=CH_2$ and $R^2$ is

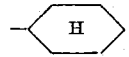

is obtained as blue crystals having the melting point 155° to 157° C. The dye dyes textile material of polyethylene terephthalate blue violet shades.

*Example 51*

21 parts of cinnamyl chloride is allowed to flow at 20° C. while stirring into a solution of 34 parts of 1,4-diaminoanthraquinone-2-carboxylic acid isobutyl ester in 153 parts of N-methylpyrrolidone. The reaction mixture heats up and the reaction product begins to separate out. The mixture is heated for another hour at 50° C. and then allowed to cool. The deposited product is filtered off by suction, and washed with N-methylpyrrolidone and then with methanol until the washing liquid running away has only slight coloration. The product is dried and 44.5 parts of the dye of the Formula I in which $R^1$ is

—$CH_2CH(CH_3)_2$ and $R^2$ is

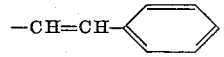

are obtained as blue violet crystals having the melting point 160° C. The dye dyes textile material of polyethylene terephthalate blue shades.

*Examples 52 to 67*

A mixture of 90 parts of water, 21 parts of butyl acrylate, 7.5 parts of methacrylamide, 5.5 parts of a 20% aqueous solution of the sodium salt of a sulfonated reaction product of isooctylphenol with 25 moles of ethylene oxide, 0.4 part of a 50% aqueous solution of the sodium salt of sulfonated castor oil and 0.5 part of potassium persulphate is heated to 80° C. under an atmosphere of nitrogen and vigorously stirred. When polymerization has been initiated, a mixture of 76 parts of water, 4 parts of 1-amino-4-acryloylaminoanthraquinone - 2 - carboxylic acid isopropyl ester, 87.5 parts of butyl acrylate, 7.5 parts of methacrylamide, 22.5 parts of methyl methacrylate, 1 part of a 20% aqueous solution of the sodium salt of a sulfonated reaction product of isooctylphenol with 25 moles of ethylene oxide, 0.8 part of a 50% aqueous solution of the sodium salt of sulfonated castor oil and, separately therefrom, 1 part of potassium persulfate in 20 parts of water are added during the course of one hour and the temperature is kept at 80° C. for another five hours.

A 44.3% blue violet dispersion is obtained which may be used in the following away for dyeing and finishing a cotton fabric:

50 parts of the dispersion are mixed with 47 parts of water, 2.5 parts of an 85% aqueous solution of the dimethylol compound of butanediol-1,4-diurethane, 0.5 part of ammonium nitrate and 0.2 part of the sodium salt of sulfonated oleic acid hexamethylenimide. Cotton fabric is impregnated with this liquor, stretched on a frame and dried at 140° C. for one hour. A wash fast, rub fast and light fast brilliant blue violet dyeing is obtained with simultaneous resin finish of the cotton fabric.

Blue violet dispersions having similar compositions are obtained from other monomeric dyes having the Formula I by the same general process of preparation. Results of such experiments are given in the following Table 7. In order to show that individual dye monomers to be used according to this invention are equally readily copolymerizable, the remaining experimental conditions in Examples 53 to 67 are kept substantially constant. The dyes are prepared according to, or analogously to, the foregoing Examples 12 to 27. In Table 7, the columns have the following significance:

E gives the number of the examples.
A specifies the alcohol of the ester group in the colored monomer.
C gives the composition of the copolymer or initial mixture of monomers, I being the colored monomer, $a$ being butyl acrylate, $b$ being methyl methacrylate and $c$ being methacrylamide.
S gives the solids content of the dispersion in percent, and
L gives an indication of the light fastness, the letters $nd$ indicating that in these cases the light fastness was not determined.

TABLE 7

| E | A | C | | | | S | L |
|---|---|---|---|---|---|---|---|
| | | I | $a$ | $b$ | $c$ | | |
| 52 | Propanol | (See above) | | | | | 5 |
| 53 | Butanol | 2.6 | 72.4 | 15 | 10 | 52.0 | 4–5 |
| 54 | Pentanol | 2.6 | 72.4 | 15 | 10 | 45.3 | 5 |
| 55 | Hexanol | 2.6 | 72.4 | 15 | 10 | 43.8 | 5–6 |
| 56 | Octanol | 2.6 | 72.4 | 15 | 10 | 41.8 | nd |
| 57 | 2-methylpropanol | 2.6 | 72.4 | 15 | 10 | 40.6 | 5–6 |
| 58 | do | 2.6 | 65.6 | 15.6 | 10.4 | 37.7 | 6 |
| 59 | do | 13 | 62 | 15 | 10 | 49.3 | 6 |
| 60 | 3-methylbutanol | 2.6 | 72.4 | 15 | 10 | 49.4 | nd |
| 61 | 6-methylheptanol | 2.6 | 72.4 | 15 | 10 | 44.7 | nd |
| 62 | Ethylene glycol monoethyl ether | 2.6 | 72.4 | 15 | 10 | 45.9 | 6 |
| 63 | Ethylene glycol monopropyl ether | 2.6 | 72.4 | 15 | 10 | 44.4 | 6 |
| 64 | Ethylene glycol monobutyl ether | 2.6 | 72.4 | 15 | 10 | 44.7 | 6 |
| 65 | Ethylene glycol monoisopropyl ether | 2.6 | 72.4 | 15 | 10 | 45.7 | 6 |
| 66 | Ethylene glycol monoisopentyl ether | 2.7 | 72.3 | 15 | 10 | 45.3 | nd |
| 67 | Diethylene glycol monomethyl ether | 2.6 | 72.4 | 15 | 10 | 45.6 | 6 |

*Example 68*

100 parts of a 39% colorless polymer dispersion prepared as described below is well mixed with 10 parts of 1-amino-4-acryloylaminoanthraquinone-2-carboxylic acid isobutyl ester, 10 parts of butyl acrylate, 81.8 parts of water, 10 parts of a 20% aqueous solution of the sodium salt of a sulfonated reaction product of isooctylphenol with 25 moles of ethylene oxide and 0.4 part of a 50% solution of the sodium salt of sulfonated castor oil. In order to graft the dye onto the polymer, the mixture is exposed to high irradiation (having an output of 1000 rad./min.) at 40° to 50° C. for 100 minutes. 10 parts of water, 4.5 parts of an 85% aqueous solution of the dimethylol compound of butanediol-1,4-diurethane, 0.5 part of ammonium nitrate and 0.2 part of the sodium salt of sulfonated oleic acid hexamethylenimide are added to 85 parts of the irradiated mixture.

A cotton fabric is impregnated with this liquor, stretched on a frame and dried for one hour at 140° C. A wash fast and rub fast violet dyeing is obtained.

The polymer dispersion used above is obtained by emulsion polymerization of 370 parts of butyl acrylate and 30 parts of methacrylic acid methylolamide in 600 parts of water in the presence of 5 parts of potassium persulphate as catalyst, and also 6 parts of the sodium salt of a sulfonated reaction product of isooctylphenol with 25 moles of ethylene oxide and 0.6 part of the sodium salt of sulfonated castor oil as emulsifier.

We claim:
1. A dye of the formula

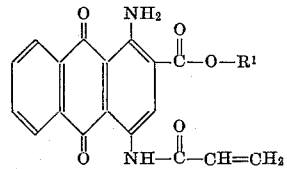

wherein $R^1$ denotes an aliphatic radical of from 2 to 8 carbon atoms selected from the group consisting of alkyl, alkoxyalkyl and polyalkoxyalkyl.

2. The dye of the formula

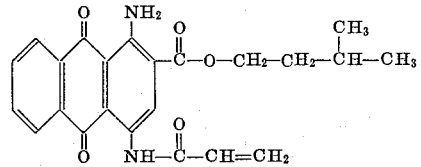

3. The dye of the formula

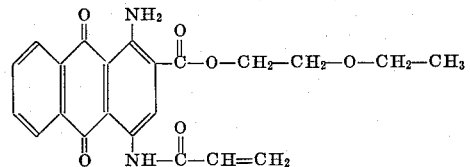

4. The dye of the formula

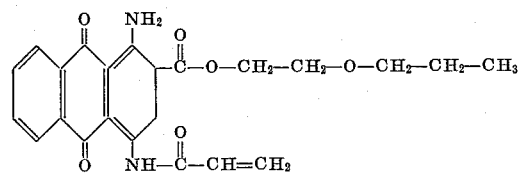

5. The dye of the formula
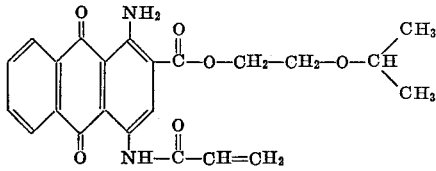
6. The dye of the formula
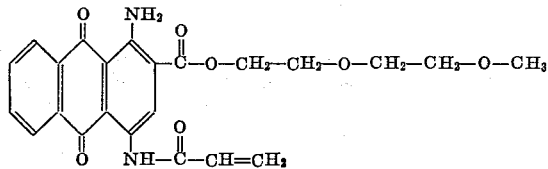
References Cited by the Examiner
UNITED STATES PATENTS
| | | | |
|---|---|---|---|
| 2,632,004 | 3/1953 | Minsk et al. | 260—384 X |
| 2,794,031 | 5/1957 | Frey et al. | 260—377 |
| 2,794,032 | 5/1957 | Frey et al. | 260—377 |
| 2,823,212 | 2/1958 | Anton et al. | 260—376 |
| 3,079,389 | 2/1963 | Kern et al. | 260—376 X |
LORRAINE A. WEINBERGER, *Primary Examiner.*
LEON ZITVER, *Examiner.*
R. K. JACKSON, H. C. WEGNER, *Assistant Examiners.*

UNITED STATES PATENT OFFICE
CERTIFICATE OF CORRECTION

Patent No. 3,277,119　　　　　　　　　　　　　　October 4, 1966

Karl-Heinz Beyer et al.

It is hereby certified that error appears in the above numbered patent requiring correction and that the said Letters Patent should read as corrected below.

Column 7, line 47, for "by" read -- but --; column 9, line 18, for "away" read -- way --; same column 9, Table 7, seventh column thereof, under heading "S" line 8, for "49.4" read -- 44.9 --.

Signed and sealed this 29th day of August 1967.

(SEAL)
Attest:

ERNEST W. SWIDER
Attesting Officer

EDWARD J. BRENNER
Commissioner of Patents